UNITED STATES PATENT OFFICE.

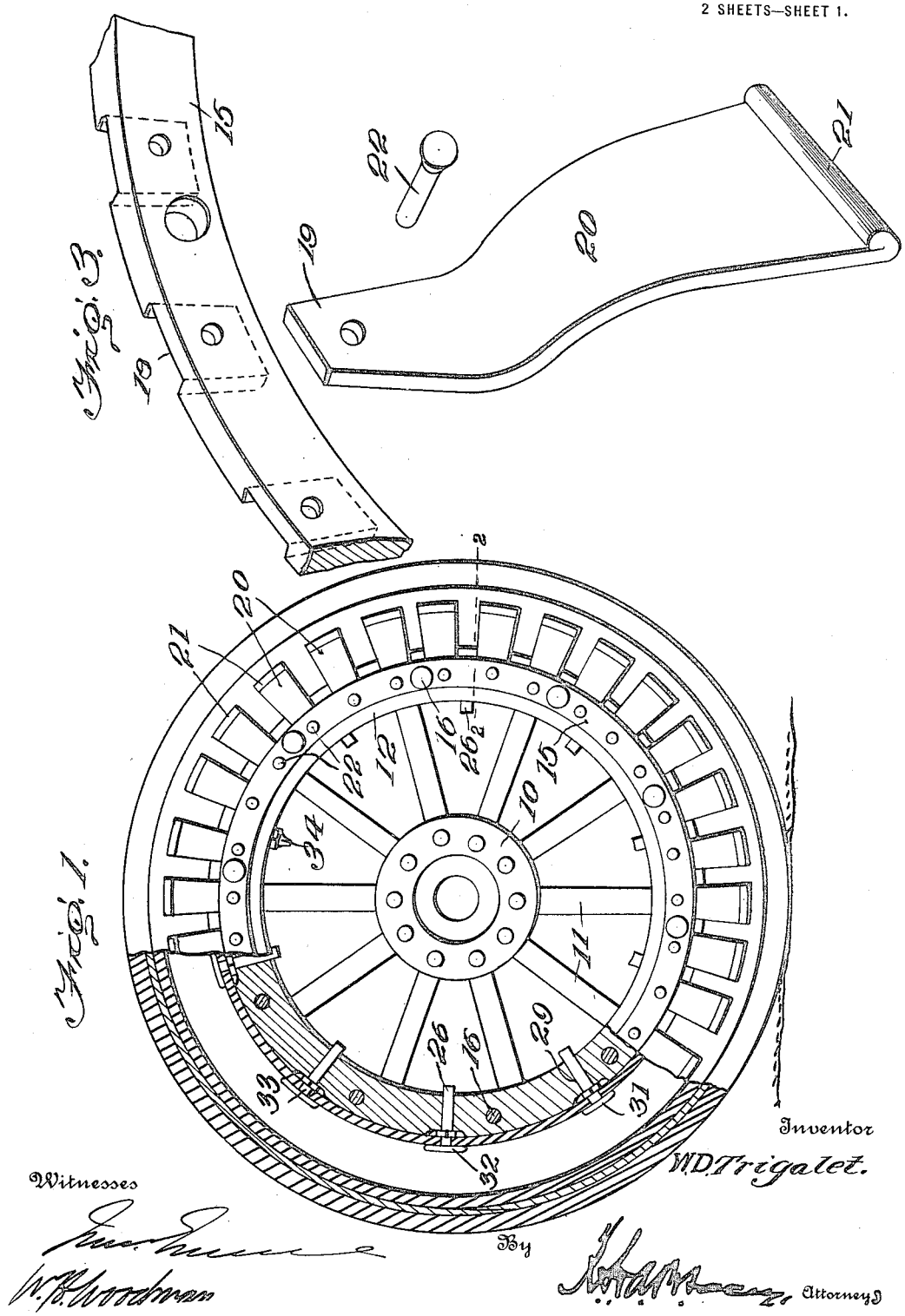

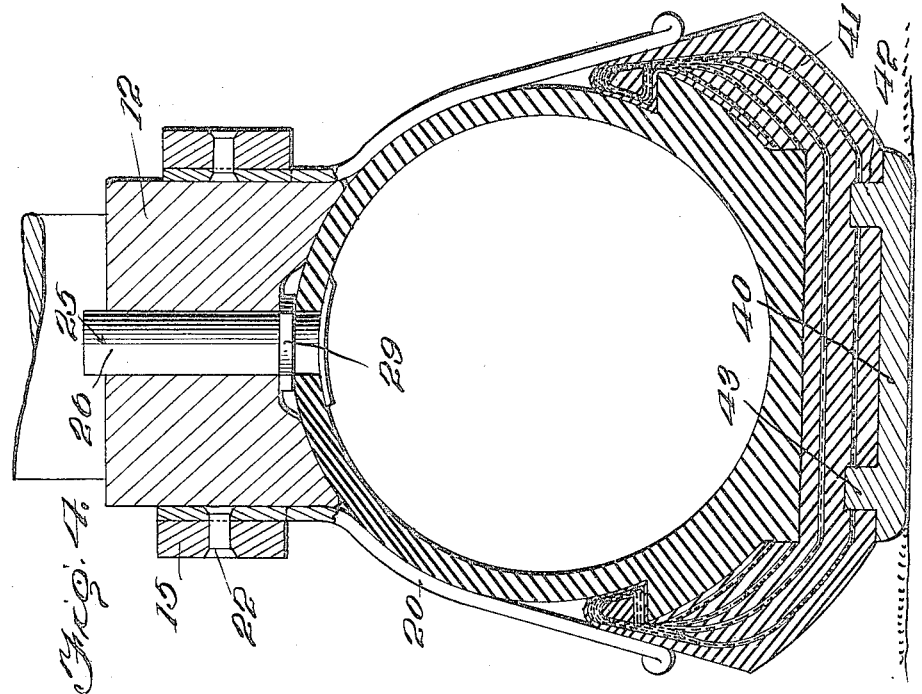
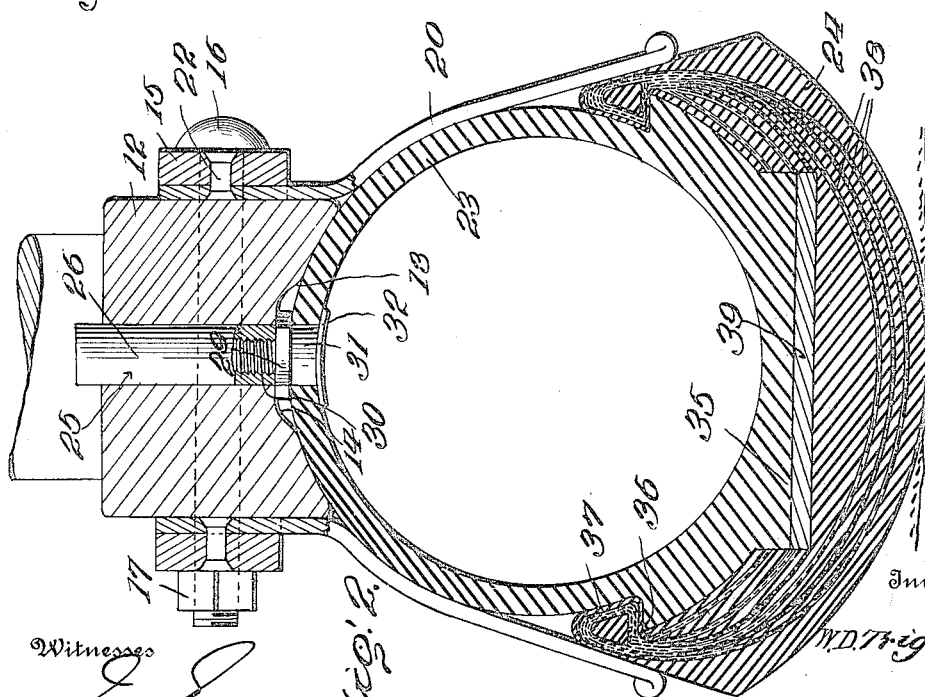

WALTER D. TRIGALET, OF MAMARONECK, NEW YORK.

PNEUMATIC TIRE.

1,140,777.   Specification of Letters Patent.   Patented May 25, 1915.

Application filed August 27, 1913. Serial No. 786,984.

*To all whom it may concern:*

Be it known that I, WALTER D. TRIGALET, citizen of the United States, residing at Mamaroneck, in the county of Westchester and State of New York, have invented certain new and useful Improvements in Pneumatic Tires, of which the following is a specification.

My invention relates to new and useful improvements in pneumatic tires, the primary object of my invention being the provision of a pneumatic tire which will revision of the inner tube and casing now in use place and which will eliminate punctures, blowouts, and rim cutting.

A further object of my invention is to provide a novel means of fastening my tire upon a wheel rim in such a manner that in use the tire will be supported and strengthened by resilient springs or shields, these springs or shields being so arranged as to also form the means for securing the tire in place.

A further object of my invention is to so construct and mount the springs that they may be readily removed from the rim of the wheel to permit removal of the tire when desired. And a still further object of my invention is to provide a simple and effective means for preventing longitudinal creeping of the tire about the wheel.

With these and other objects in view, my invention will be more fully described, illustrated in the accompanying drawing and then specifically pointed out in the claims which are attached to and form a part of this application.

In the drawings: Figure 1 is a fragmentary elevational view of a wheel equipped with my improved pneumatic tire, a portion of the wheel and tire being shown in section; Fig. 2 is a sectional view on the line 2—2 of Fig. 1; Fig. 3 is a fragmentary perspective view of one of the spring-holding rings, together with one of the springs carried thereby, the parts being shown in unassembled position; Fig. 4 is a sectional view similar to that shown in Fig. 2, but illustrating a slightly modified form of tire construction.

Corresponding and like parts are referred to in the following description and indicated in all the views of the accompanying drawing by the same reference characters.

In order to clearly understand the construction and application of my pneumatic tire, I have illustrated the same in conjunction with a conventional form of vehicle wheel including a hub 10, a plurality of radial spokes 11, and a rim 12, the wheel illustrated being of the artillery type and the spokes and rim being preferably formed of wood in the usual manner. The rim is formed with a peripheral groove or channel 13 rounded transversely as shown in Fig. 2, and provided at spaced intervals with recesses 14 the purpose of which will be hereinafter explained.

Spring-carrying rings 15 are secured one to each side of the rim 12 by a plurality of spaced bolts 16 passed through the rings and rim and locked in place by nuts 17. These rings are provided in their inner faces with a plurality of equally spaced apart, squared sockets or recesses 18 to seat the narrow ends 19 of a plurality of guard springs 20. Each of these springs is formed of resilient metal, preferably steel, tapering in width toward the end 19 and provided at its opposite end with an out-bent bead 21. Each spring is also bowed upwardly intermediate its length in such a manner that a pneumatic tire, when seated upon the wheel rim between the series of springs carried by the two rims, will seat evenly against the inner faces of the springs. The sockets 18 are proportioned to snugly receive the ends 19 of the springs to prevent all twisting or turning movement thereof and the springs are firmly secured to the rings by rivets 22. This peculiar manner of mounting the springs upon the rings, as previously pointed out, holds the springs against movement and also leaves both faces of the ring smooth for uniform engagement against the wheel rim and to present a neat appearance. Moreover, it will be clear that the tire may be readily removed from the rim at any time by removing one or both of the rings, together with the springs carried thereby and that such removal of the rings does not cause any disassembling of the parts.

Referring more specifically to the pneumatic tire construction which is best shown in Fig. 2 of the drawing, it will be seen that the tire consists primarily of a pneumatic tube 23 and a tread or shoe 24. The walls of the tube 23 are considerably thicker than those of the usual inner tube for pneumatic tires, being preferably built up much after the manner of the usual pneumatic tire casing or bicycle tube from canvas or other suitable fabric embedded in vulcanized rubber. While I believe it not necessary to provide against longitudinal creeping of said tire about the rim I provide a plurality of anchoring studs 25. Each of these anchoring studs includes a shank or body portion proper 26 provided at its inner end with an encircling shoulder 29 and a centrally formed, internally threaded socket 30. These studs extend through the rims with their inner ends seating in the recesses 14 thereof and the tube 23 is secured to the studs by locking screws 31 having heads 32 shaped to engage against the inner face of the tube and a threaded shank 33 to seat in the socket 30 and thus clamp the tube between the head 32 and shoulder 29. The tube is also provided with the customary valve 34 by means of which it may be inflated.

The pneumatic tube 23 is further thickened at its outer periphery to provide a circumferential tread engaging shoulder 35 having a transversely extended face and at either side to provide laterally directed circumferential shoulders 36 for locking engagement with locking beads 27 formed upon the edges of the tread or shoe 24. This tread or shoe is built up much after the manner of the usual pneumatic tire casing from canvas or other suitable fabric embedded in vulcanized rubber, the strips of canvas or fabric 38 having their edge portions folded upon themselves to provide the retaining beads 37. The inner face of this tread is shaped to engage about the shoulder 35 and in order to insure the tube against punctures a relatively thin shield 39, of resilient metal, is interposed between the tread and the shoulder 35. The tube, tread and springs are so proportioned and arranged that the interlocking shoulders and beads 36 and 37 of the tube and tread lie within the outer edge portions of the springs and the springs thereby assist in preventing disengagement of said parts.

In Fig. 4 of the drawings, I have shown a slightly modified form of construction which is practically identical with that previously described with the exception that the interposed shield 39 is omitted and replaced by an outer shield 40 formed of resilient metal and disposed about the outer periphery of the tread 41. This tread is similar in construction to the tread 24, but is provided at spaced intervals with sockets 42 formed in oppositely disposed pairs and adapted to receive inwardly directed studs 43 formed upon the inner face of the shield 40. This construction provides a metallic armor or tread plate for the tire, while the seating of the studs 43 in the sockets 42 of the tread prevents any independent movement or creeping of the shield with respect to the tire.

In applying my pneumatic tire, the tube 23 is positioned upon the rim while deflated, the locking studs 31 being preferably passed into the inner ends of the bores of the rim and the studs 25 then passed outwardly through the rim and threaded into place. With the form of tire shown in Fig. 2, the shield 39 is then placed within the tread 24 and the latter positioned about the tire which in the meantime has been partially filled with air. The rings 15, together with their springs are then fastened in place upon either side of the tire, after which the tire is fully inflated. This inflation of the tire forces the same against the springs and insures a positive locking engagement between the shoulders 36 and beads 37 of the tube and shoe, respectively.

In the form of tire shown in Fig. 4, the assembling is the same with the exception that the metallic shield body is positioned about the tread before the same is applied to the partially inflated tube.

The above described tire is practically blow-out proof, as blow-outs are generally due to excessive flexing or distortion of the tire casing causing folds or cracks in the fabric and consequent weak spots. The metallic shields employed in connection with my tire prevent such flexing or distortion of the fabric and, consequently, prevent the formation of folds therein and weakening of the tread. The reinforcing springs protect the tire to a great extent from injury from the side such as might be caused by stones or raised trolley tracks and the like and absolutely prevent displacement of the tire from the wheel. The tread of my tire protects the pneumatic tube from wear and tear, serves either to inclose the metallic shield or as an anchor for the shield and gives a greater width of bearing surface for the wheel.

The metallic shield 39 is preferably made in the form of a split ring having beveled overlapping ends in order to permit longitudinal expansion on and with the tube when inflating the same. To prevent binding between the tube and this shield, the shield may be coated internally with some lubricating oil including graphite in its composition.

Although I have illustrated and described a pneumatic tire construction in all its details, it will, of course, be understood that I do not wish to limit myself to the specific details set forth, as various minor changes, within the scope of the appended claims, may be made at any time, if desired, without in the slightest degree departing from the spirit of my invention.

What I claim is:

1. The combination with a wheel rim, of rings adapted to be secured upon the opposite sides of the rim, said rings having their inner faces recessed at intervals to provide spaced radial sockets closed at their inner ends and opening through the inner faces and outer edges of the rings, the radial sides of such sockets converging inwardly, and a plurality of resilient metallic shield members tapering from their outer to their inner ends secured to the rings with their inner ends seating in the sockets thereof, said shields extending at their free ends beyond the rim to receive and support a tire.

2. A tire retaining flange adapted for attachment to the side of a wheel rim including an annular body member having that face which will engage against the wheel rim recessed at intervals to provide spaced radial sockets closed at their inner ends and opening through the inner face and outer edge of the body, the radial sides of said sockets converging inwardly, the body member being formed with an opening through each socket portion and with openings through certain of the thicker portions between the sockets, the latter openings being adapted to receive fastening devices for securing the flange to the wheel rim, a plurality of resilient metallic tire engaging shield members tapering from their outer to their inner ends with their inner ends seated in the sockets thereof, said inner ends of the shield members having openings which aline with the openings through the socket portions of the body member, said shields extending at their free ends beyond the body to supportingly engage a tire, the closed inner ends of the sockets taking up the thrust exerted upon the shields by the tire, and fastening devices passed through the alined openings of the body member and shield members.

In testimony whereof I affix my signature in presence of two witnesses.

WALTER D. TRIGALET. [L. S.]

Witnesses:
ALBERT G. NURENBERG,
JOHN C. KANE, Jr.

Copies of this patent may be obtained for five cents each, by addressing the "Commissioner of Patents. Washington, D. C."